(12) United States Patent
Ivanich et al.

(10) Patent No.: US 8,705,872 B2
(45) Date of Patent: *Apr. 22, 2014

(54) SYSTEMS AND METHODS FOR HAND GESTURE CONTROL OF AN ELECTRONIC DEVICE

(71) Applicant: EchoStar Technologies L.L.C., Englewood, CO (US)

(72) Inventors: William Ivanich, Parker, CO (US); Bin Xu, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/867,809

(22) Filed: Apr. 22, 2013

(65) Prior Publication Data

US 2013/0229344 A1  Sep. 5, 2013

Related U.S. Application Data

(63) Continuation of application No. 12/533,698, filed on Jul. 31, 2009, now Pat. No. 8,428,368.

(51) Int. Cl.
*G06K 9/62* (2006.01)

(52) U.S. Cl.
USPC .......................... 382/209; 345/156; 382/103

(58) Field of Classification Search
USPC ................................. 382/103, 209; 345/156
See application file for complete search history.

(56) References Cited

U.S. PATENT DOCUMENTS

| | | | |
|---|---|---|---|
| 5,594,469 A | 1/1997 | Freeman et al. | |
| 7,706,896 B2 | 4/2010 | Music et al. | |
| 7,721,207 B2 * | 5/2010 | Nilsson | 715/707 |
| 7,821,541 B2 | 10/2010 | Delean | |
| 7,975,243 B2 | 7/2011 | Zheng et al. | |
| 8,014,567 B2 | 9/2011 | Yoon et al. | |
| 8,064,704 B2 * | 11/2011 | Kim et al. | 382/190 |
| 2004/0193413 A1 | 9/2004 | Wilson et al. | |
| 2005/0132420 A1 * | 6/2005 | Howard et al. | 725/135 |
| 2005/0275635 A1 | 12/2005 | Dehlin et al. | |
| 2005/0275636 A1 | 12/2005 | Dehlin et al. | |
| 2006/0209021 A1 | 9/2006 | Yoo et al. | |
| 2007/0124694 A1 | 5/2007 | Van De Sluis et al. | |
| 2008/0267447 A1 | 10/2008 | Kelusky et al. | |
| 2009/0027337 A1 | 1/2009 | Hildreth | |
| 2009/0079813 A1 | 3/2009 | Hildreth | |
| 2009/0133051 A1 | 5/2009 | Hildreth | |
| 2009/0138805 A1 | 5/2009 | Hildreth | |
| 2009/0304205 A1 * | 12/2009 | Hardacker et al. | 381/104 |
| 2010/0027845 A1 * | 2/2010 | Kim et al. | 382/107 |
| 2010/0050134 A1 | 2/2010 | Clarkson | |
| 2011/0267625 A1 | 11/2011 | Guelachvili et al. | |
| 2011/0292181 A1 | 12/2011 | Acharya et al. | |
| 2013/0190089 A1 * | 7/2013 | Wilson et al. | 463/36 |

* cited by examiner

*Primary Examiner* — Gregory M Desire
(74) *Attorney, Agent, or Firm* — Lowe Graham Jones PLLC

(57) ABSTRACT

Systems and methods of generating device commands based upon hand gesture commands are disclosed. An exemplary embodiment generates image information from a series of captured images, generates commands based upon hand gestures made by a user that emulate device commands generated by a remote control device, identifies a hand gesture made by the user from the received image information, determines a hand gesture command based upon the identified hand gesture, compares the determined hand gesture command with the plurality of predefined hand gesture commands to identify a corresponding matching hand gesture command from the plurality of predefined hand gesture commands, generates an emulated remote control device command based upon the identified matching hand gesture command, and controls the media device based upon the generated emulated remote control device command.

20 Claims, 4 Drawing Sheets

SYSTEMS AND METHODS FOR HAND GESTURE CONTROL OF AN ELECTRONIC DEVICE

PRIORITY CLAIM

This patent application is a Continuation of U.S. Non-Provisional patent application Ser. No. 12/533,698, filed Jul. 31, 2009, granted as U.S. Pat. No. 8,428,368, and entitled "SYSTEMS AND METHODS FOR HAND GESTURE CONTROL OF AN ELECTRONIC DEVICE," the content of which is herein incorporated by reference in its entirety.

BACKGROUND

Often, controlling a set top box (STB), a media device or other system using a remote control device is difficult or inconvenient. For example, a person eating dinner while watching a television (TV) may have difficulty in reaching for and using the remote control device. In other instances, a person may have lost their remote control device and would have to make changes to their media system using the manual controls on the STB and/or the media device or system. If the person wishes to quickly perform an operation under these circumstances, such as pausing during a scene of interest, inability to quickly access their remote control device may prevent the person from performing the pause function in a timely manner.

In some situations, it may be physically impossible for a person to operate a remote control device. For example, a person with severe physical disabilities may not have sufficient control of their fingers to manually operate the remote control device. As another example, a person in a hospital recovering from surgery may not be able to reach and/or operate the remote control device.

Accordingly, there is a need for a person to have alternative ways to generate device commands, particularly if their remote control device is not conveniently available and/or if they are unable to operate their remote control device.

SUMMARY

Systems and methods of generating device commands based upon hand gesture commands are disclosed. An exemplary embodiment generates image information from a series of captured images, generates commands based upon hand gestures made by a user that emulate device commands generated by a remote control device, identifies a hand gesture made by the user from the received image information, determines a hand gesture command based upon the identified hand gesture, compares the determined hand gesture command with the plurality of predefined hand gesture commands to identify a corresponding matching hand gesture command from the plurality of predefined hand gesture commands, generates an emulated remote control device command based upon the identified matching hand gesture command, and controls the media device based upon the generated emulated remote control device command.

BRIEF DESCRIPTION OF THE DRAWINGS

Preferred and alternative embodiments are described in detail below with reference to the following drawings.

DETAILED DESCRIPTION

Figure 1:
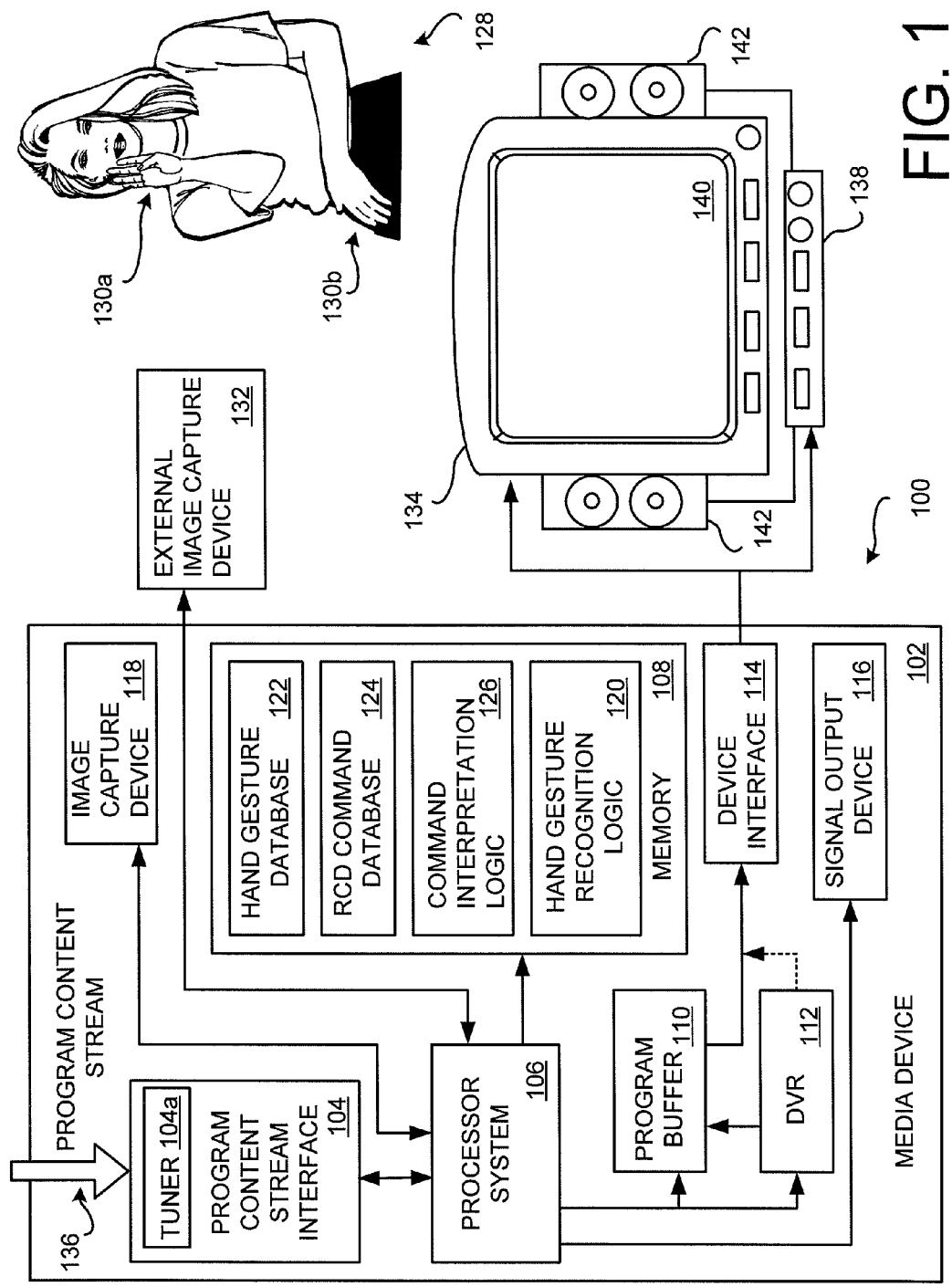
FIG. 1 is a block diagram of an exemplary hand gesture control system that is operable to control a media device.
Figure 2:
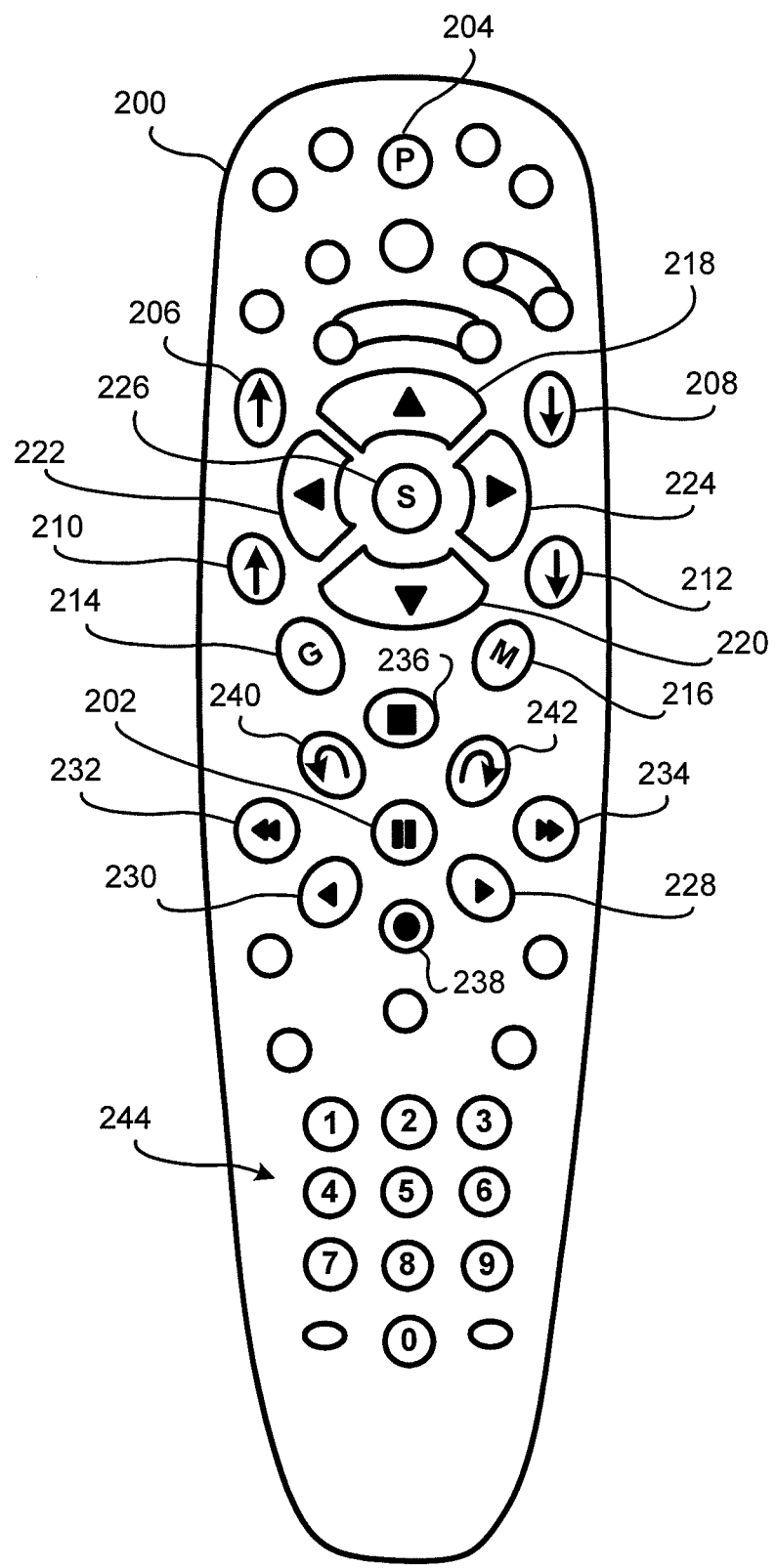
FIG. 2 is a block diagram of an exemplary remote control device that is operable to control a media device.

FIG. 1 is a block diagram of a hand gesture control system 100 that is operable to control a media device 102, such as, but not limited to, a set top box (STB). FIG. 2 is a block diagram of an exemplary remote control device 200 that is operable to control the media device 102. The hand gesture control system 100, in an exemplary embodiment, monitors hand gestures from a user and, based upon the hand gestures, emulates commands that may be generated from the remote control device 200. Embodiments of the hand gesture control system 100 may be implemented in other media devices, such as, but not limited to, stereos, radios, televisions (TVs), digital video disc (DVD) players, digital video recorders (DVRs), a personal computer (PC) and/or a home appliance so as to emulate their corresponding remote control device 200.

The non-limiting exemplary media device 102 comprises a program content stream interface 104, a processor system 106, a memory 108, a program buffer 110, an optional digital video recorder (DVR) 112, a device interface 114, an optional signal output device 116, and an optional image capture device 118. The memory 108 comprises portions for storing the hand gesture recognition logic 120, the hand gesture database 122, the remote control device (RCD) command database 124, and the command interpretation logic 126. In some embodiments, the hand gesture recognition logic 120 and the command interpretation logic 126 may be integrated together, and/or may be integrated with other logic. Other media devices, and other devices having the hand gesture control system 100 implemented therein, may include some, all, or none of the above-described media processing components. Further, additional components not described herein may be included in alternative embodiments.

The image capture device 118 is pointed outwardly from the media device 102 in a direction that is anticipated to result in captured images of one or both of the user's hands 130a, 130b. Alternatively, or additionally, an external image capture device 132, which may be portable, may be positioned so as to be pointed towards the user 128. For example, the media device 102 may be located above, behind and/or to the side of the user 128 such that an image capture device 118 would not be able to capture images of the user's hand gestures. Thus, the external image capture device 132 may be independently placed and oriented in another location in a media room so as to capture images of the user's hand gestures. The external image capture device 132 may communicate captured image information to the media device 102 using any suitable communication medium, including physical wires, light, or radio frequency (RF).

The image capture devices 118, 132 are operable to capture a sequential series of still images of the user 128, and more particularly, images of one or both of the user's hands 130a, 130b. Image information corresponding to the captured images is then generated and communicated to the processor system 106. The time between successive captured images must be short enough so as to provide a meaningful interpretation of the movement of the user's hands 130a, 130b. In some embodiments, the image capture devices 118, 132 may be a video camera. Accordingly, image information generated from a plurality of selected still images captured by the video camera are processed to determine the hand gesture movements of the user 128.

Conceptually describing operation of the hand gesture control system 100, embodiments of the hand gesture recognition logic 120 analyze image data received from the image capture device 118 and/or the external image capture device 132. The image information is processed to determine the location and movement of one or both of the user's hands 130a, 130b. In an exemplary embodiment, identification of the user's hands 130a, 130b is based upon the identification of the location of predefined points on the user's hands 130a, 130b, known as markers or the like. The movement of the markers are tracked to determine what hand gesture the user 128 is making. A hand gesture command is generated based upon the tracked movement, or hand gesture, of the user 128.

The determined hand gesture command is then correlated, compared, or the like, to corresponding hand gesture commands residing in the remote control device command database 124 to identify a matching hand gesture. Then, the command interpretation logic 126 generates the appropriate emulated remote control device command(s) based upon the identified matching hand gesture command.

Depending upon the determined emulated remote control device command, the determined emulated remote control device command is performed by the media device 102. For example, but not limited to, the emulated remote control device command may turn on or turn off the media device 102.

Other emulated remote control device commands may be generated and communicated to other controlled media presentation devices, such as the television 134. Here, the optional signal output device 116 communicates the emulated remote control device command to the controlled media presentation device by transmitting a signal that uses the same communication media, and the same signal format, as the remote control device 200. That is, the signal output device 116 may output an infrared or radio frequency (RF) signal that is identical to the corresponding output signal of the remote control device 200. Accordingly, based upon the determined user hand gesture commands, the media device 102 can then control various media devices in accordance with the determined hand gesture commands.

For example, the user's right hand 130a is illustrated as being held in an upward, palm-out position. Here, an embodiment of the hand gesture control system 100 would interpret images of the user 128 to identify the user's right hand 130a, and recognize the position of the user's right hand 130a. Further, based upon previously captured images and using the hand gesture recognition logic 120, embodiments determine that the user 128 has moved their right hand 130a from another position (not shown) to the illustrated upward, palm-out position. In view of the movement and/or the final position of the user's right hand 130a, the hand gesture control system 100 would understand that a hand gesture command has been intended by the user 128.

The identified hand gesture of the user 128 is used to generate a hand gesture command. The determined hand gesture command is compared to a plurality of corresponding hand gesture commands stored in the hand gesture database 122. A matching hand gesture command is identified from the plurality of hand gesture commands stored in the hand gesture database 122. Once the corresponding matching hand gesture command in the hand gesture database 122 is identified, then the command interpretation logic 126 is used to determine the emulated remote control device command intended by the user 128. Then, the emulated remote control device command controls the media device 102 and/or other connected electronic devices.

For example, but not limited to, a hand gesture ending with the upward, palm-out position of the user's hand 130a illustrated in FIG. 1 may be associated with a pause command that pauses play of a presented program. In an exemplary embodiment, a remote control device 200 includes a pause button 202 thereon that, when actuated by the user 128, also pauses play of the presented program. Thus, the hand gesture ending with the upward, palm-out position of the user's right hand 130a emulates the pause button 202 of the remote control device 200. To pause presentation of the viewed program, the user 128 simply gestures with their right hand 130a by moving their hand 130a to the upward, palm-out position.

Further, it is appreciated that the other hand 130b of the user 128 may, or may not be, moved with the intention of generating a command. Here, the user's left hand 130b is apparently remaining in a substantially stationary position in their lap. Accordingly, the hand gesture control system 100 determines that the user's left hand 130b has not been moved with the intent of making a hand gesture command.

In the various embodiments, the hand gesture recognition logic 120 is configured to identify the hands 130a, 130b of the user 128 from other parts of the user's body. For example, but not limited to, primitives and/or artifacts corresponding to the hands and other parts of the user 128 may be generated from the captured images. Thus, the user's hand gestures can be distinguished from other movements of the user 128. Further, the hand gesture recognition logic 120 is configured to identify the hands 130a, 130b of the user 128 from other background objects and/or people.

In some situations, two or more people may be visible within the field of view of the image capture devices 118, 132. For example, small children may be in the same room as the user 128. It is appreciated that the small children are not authorized users whose hand gestures should be interpreted as commands for the media device 102. In some embodiments, the hand gesture recognition logic 120, or other suitable logic, identifies authorized users from other viewers or other people within the field of view of the image capture devices 118, 132. Thus, hand gestures from an authorized user 128 may be identified from hand gestures of other people such that commands are generated only from hand gestures from the authorized user 128. In some embodiments, there may be multiple authorized users 128. Any suitable person identification logic, such a facial recognition programs or the like, may be used to identify an authorized user 128.

In other embodiments, the field of view of the image capture devices 118, 132 may be selected so that captured images are substantially limited to the user 128, and/or limited to regions where the user's hands 130a, 130b are expected to be. Thus, background artifacts and other non-authorized individuals may be excluded from captured images that are analyzed to determine the occurrence of a hand gesture command from the user 128.

In some embodiments, multiple users 128 may be authorized to issue hand gesture commands. Thus, a plurality of image capture devices 118, 132 may be positioned and/or oriented at desired locations where authorized users 128 are expected to be located. Further, the field of view of such image capture devices 118, 132 may be selected so that captured images are substantially of the user 128, and/or of regions where the user's hands 130a, 130b are expected to be.

To facilitate an explanation of the functionality of the remote control device 200, the functionality of the exemplary media device 102, here a set top box, is now broadly described. One or more program content streams 136 are received by the program content stream interface 104. One or more tuners 104a in the program content stream interface 104 selectively tune to one of the program content streams 136 in accordance with instructions received from the processor system 106. The program content stream 136 typically comprises a plurality of programs multiplexed together. The processor system 106, based upon a request for a program of interest specified by the user 128, parses out program content associated with the program of interest. The program content is then assembled into a stream of video and/or audio information which may be saved into the program buffer 110 such that the program content can be streamed out to the media presentation device, such as the television 134, via the device interface 114. Alternatively, or additionally, the parsed out program content may be saved into the DVR 112 for later presentation.

In this simplified embodiment, the device interface 114 is illustrated as coupled to two exemplary media presentation devices, the television (TV) 134 and a surround-sound receiver 138. The video portion of the streamed program content is displayed on the TV display 140 and the audio portion of the streamed program content is reproduced as sounds by the speakers 142.

The exemplary remote control device 200 provides a plurality of actuators, such as buttons or the like, that the user 128 actuates to initiate desired commands that are to be performed by or on the media device 102, the connected television 134, and/or the surround-sound receiver 138. A plurality of exemplary control buttons and their associated functionality are described in Table 1 below. Actuators may include descriptive text and/or icons, adjacent to or on the actuator, to indicate the functionality of that particular actuator.

TABLE 1

Remote Control Device Actuators

| | | |
|---|---|---|
| 202 | Pause Button | Pause control of presented video program |
| 204 | Power Button | Power the controlled device (On/Off) |
| 206 | Volume Up | Increase volume of the audio |
| 208 | Volume Down | Decrease volume of the audio |
| 210 | Channel Up | Increment channel up by one channel |
| 212 | Channel Down | Increment channel down by one channel |
| 214 | Guide | Display of an Electronic Program Guide (EPG) |
| 216 | Menu | Display of a menu of device Functions |
| 218 | EPG Up | Increment EPG active pane up by one row |
| 220 | EPG Down | Increment EPG active pane down by one row |
| 222 | EPG Left | Increment EPG active pane left by one column |
| 224 | EPG Right | Increment EPG active pane right by one column |
| 226 | EPG Select | Select EPG active pane |
| 228 | FWD | Forward presented video |
| 230 | REV | Reverse presented video |
| 232 | FREW | Fast reverse/rewind presented video |
| 234 | FFWD | Fast forward presented video |
| 236 | Stop | Stop current remote control device function |
| 238 | DVR Record | Record using digital video recorder (DVR) |
| 240 | Jump Backward | Rewind presented video program to last marker |
| 242 | Wind Forward | Wind presented video program to next marker |
| 244 | Number Buttons | Buttons to specify numerical values |

It is appreciated that other actuators having other functionality not described above may be included on the remote control device 200. The functionality of such actuators, or combination of actuators, may be emulated by suitable hand gestures that generate corresponding hand gesture commands. Further, it is appreciated that other types of remote control devices that control other types of electronic devices may also be emulated by alternative embodiments of the hand gesture control system 100.

In another example, the user 128 may wish to scroll through a displayed electronic program guide (EPG). The image capture device 118, and/or the external image capture device 132, captures one or more real-time images of the user 128, and hence captures an image of the user's moving hand. Based upon the hand gesture, the hand gesture recognition logic 120 determines that the user would like to "scroll downward" by one active EPG pane. The command interpretation logic 126 then, based upon the hand gesture of the user 128, generates a corresponding device command that causes a highlighted portion on the displayed EPG to scroll downward. Here, the actuator on the remote control device 200 is the EPG down button 220, followed by actuation of the EPG select button 226. A subsequent hand gesture may then be used to select the highlighted program of interest.

FIGS. 3A-3M illustrate exemplary hand gestures of one of the user's hands 130a, 130b (FIG. 1) which generate exemplary hand gesture commands. Each of the hand gestures begin at a initial location 302 of the user's hand. In some embodiments, the initial location 302 of the user's hand is not relevant in identifying a hand gesture. In other embodiments, the initial location 302 of the user's hand is predefined.

The user's hand then traverses along a path 304 and ends up at an ending location 306. The user's hand is held in a predefined position 308 when the user's hand arrives at the ending location 306.

Figure 3A:
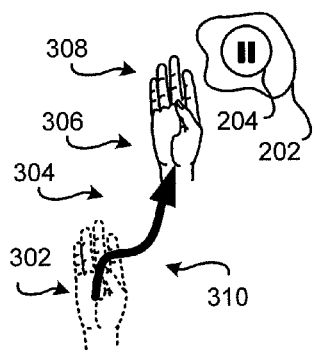
FIGS. 3A-3M illustrate exemplary hand gestures of one of the user's hands which generate exemplary hand gesture commands.

FIG. 3A illustrates an exemplary hand gesture 310 which corresponds to a pause command generated when the pause button 202 on the remote control device 200 is actuated. Here, the path 304 traversed by the user's hand corresponds to an upward and to the right movement. The path 304 corresponds to a movement of the user's hand that is not expected to be random. That is, the predefined path 304 is a specific movement required to cause the hand gesture control system 100 to generate a pause command based upon the hand gesture 310. Any suitable path of travel may be used as the path 304.

The initial location 302 of the user's hand starts as some arbitrary or predefined position, though it preferably starts in some predefined region of space with respect to the user 128 (not shown). When the user 128 desires to initiate the exemplary pause command, the user 128 moves one of their hands generally to the initial location 302.

Then, the user 128 moves their hand along the predefined path 304. When the user's hand arrives at the ending location 306, the user 128 ends the motion. That is, the user 128 stops their hand gesture 310.

Since a series of images have been captured while the user 128 is performing the hand gesture 310, the processor system 106, by executing the hand gesture recognition logic 120, is able to track the movement of the user's hand along the path 304. At least one image shows the user's hand at the initial location 302. A later image shows the user's hand at the ending location 306. Intervening images sequentially show the movement of the user's hand along the path 304.

In some embodiments, the position of the user's hand has a predefined, unique meaning. For example, with the hand gesture 310 corresponding to a pause command, the user's hand is extended in an outward, palm-out position. Any suitable hand position may be predefined to correspond to a command function. Here, the outward, palm-out position at the ending location 306 corresponds to the pause command.

In some embodiments, the position of the user's hand at the initial location 302 may optionally have to be in a predefined position. Here, the user's hand is illustrated in the outward, palm-out position. However, requiring the user's hand to be in a particular position while at the initial location 302 is optional.

Similarly, the alternative embodiments, the position of the user's hand while traversing the path 306 may have to be held in a predefined position. However, requiring the user's hand to be in a particular position while traversing the path 304 is optional.

Figure 3B:
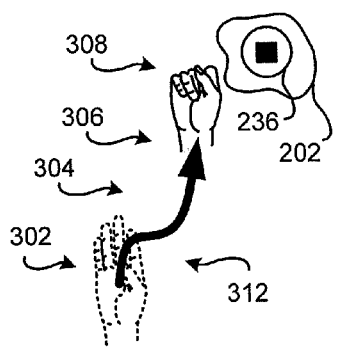

FIG. 3B illustrates an exemplary hand gesture 312 which corresponds to a stop function command generated when the stop button 236 on the remote control device 200 is actuated. Here, the non-random, predefined path 304 is again traversed by the user's hand. Also, the closed-hand or fist position of the user's hand corresponds to the stop function command. The exemplary hand gesture 312 would be used, for instance, when the user 128 has been previously performing another operation, such as on a displayed EPG. In this exemplary scenario, the stop command generated by the hand gesture control system 100 as a result of detecting the hand gesture 312 would generate a corresponding emulated remote control device command to end display of the EPG.

Figure 3C:
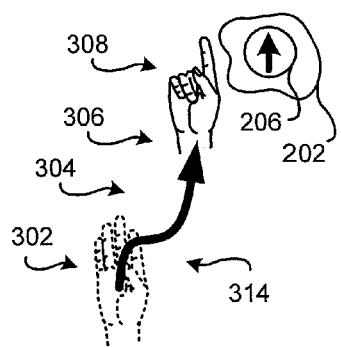

FIG. 3C illustrates an exemplary hand gesture 314 which corresponds to an increase volume command generated when the increase volume button 206 on the remote control device 200 is actuated. Here, the upward and non-random, predefined path 304 is traversed by the user's hand. Also, the upward extended index finger position of the user's hand corresponds to the increase volume command. In this exemplary scenario, the increase volume command generated by the hand gesture control system 100, as a result of detecting the hand gesture 314, would generate a corresponding emulated remote control device command to increase the audio volume of the presented program.

Figure 3D:
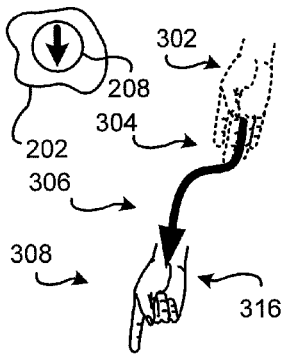

FIG. 3D illustrates an exemplary hand gesture 316 which corresponds to a decrease volume command generated when the decrease volume button 208 on the remote control device 200 is actuated. Here, the downward and non-random, predefined path 304 is traversed by the user's hand. Also, the downward extended index finger position of the user's hand corresponds to the decrease volume command. In this exemplary scenario, the decrease volume command generated by the hand gesture control system 100, as a result of detecting the hand gesture 316, would generate a corresponding emulated remote control device command to decrease the audio volume of the presented program.

Figure 3E:
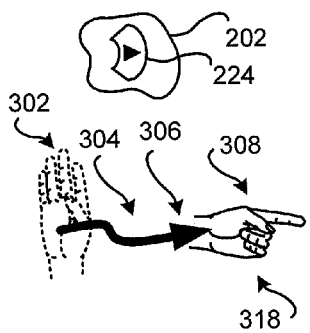

FIG. 3E illustrates an exemplary hand gesture 318 which corresponds to a command that moves the active pane of an EPG to the right by one position (EPG right command). The same command is generated when the EPG right button 224 on the remote control device 200 is actuated. Here, the non-random right hand direction of the predefined path 304 is traversed by the user's hand. Also, the extended index finger position of the user's hand towards the right corresponds to the EPG right command. In this exemplary scenario, the EPG right command generated by the hand gesture control system 100, as a result of detecting the hand gesture 318, would generate a corresponding emulated remote control device command to increment an EPG active pane right by one column on a displayed EPG.

Figure 3F:
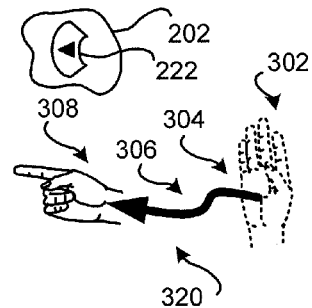

FIG. 3F illustrates an exemplary hand gesture 320 which corresponds to an EPG left command generated when the EPG left button 222 on the remote control device 200 is actuated. Here, the non-random left hand direction of the predefined path 304 is traversed by the user's hand. Also, the extended index finger position of the user's hand towards the left corresponds to the EPG left command. In this exemplary scenario, the EPG left command generated by the hand gesture control system 100, as a result of detecting the hand gesture 320, would generate a corresponding emulated remote control device command to increment an EPG active pane left by one column on the displayed EPG.

Figure 3G:
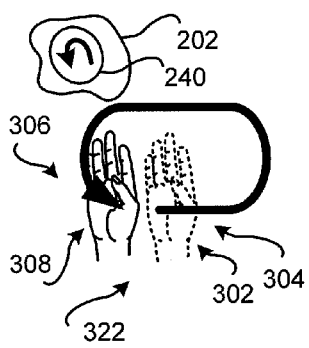

FIG. 3G illustrates an exemplary hand gesture 322 which corresponds to a jump backward command generated when the jump backward button 240 on the remote control device 200 is actuated. Here, the non-random counter clockwise hand direction of the predefined path 304 is traversed by the user's hand. Also, the extended palm-out position of the user's hand during the counter clockwise movement corresponds to the jump backward command. In this exemplary scenario, the jump backward command generated by the hand gesture control system 100, as a result of detecting the hand gesture 322, would generate a corresponding emulated remote control device command to rewind the presented video program back to a last marker embedded in the program data stream.

Figure 3H:
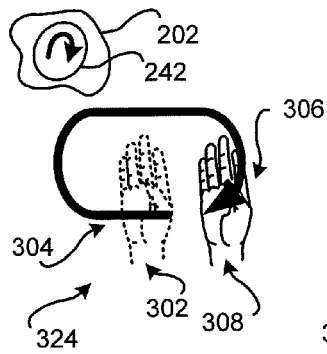

FIG. 3H illustrates an exemplary hand gesture 324 which corresponds to a wind forward command generated when the wind forward button 242 on the remote control device 200 is actuated. Here, the non-random clockwise hand direction of the predefined path 304 is traversed by the user's hand. Also, the extended palm-out position of the user's hand during the clockwise movement corresponds to the wind forward command. In this exemplary scenario, the wind forward command generated by the hand gesture control system 100, as a result of detecting the hand gesture 324, would generate a corresponding emulated remote control device command to wind (advance) the presented video program forward to a next marker embedded in the program data stream.

Figure 3I:
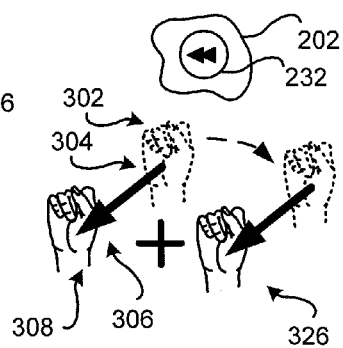

In some embodiments, multiple hand gestures performed in sequence will result in generation of a hand gesture command corresponding to an activated actuator on the remote control device 200. FIG. 3I illustrates an exemplary hand gesture 326 which corresponds to a fast reverse/rewind command generated when the fast rewind button 232 on the remote control device 200 is actuated. Here, two non-random hand gestures to the right along the predefined path 304 is traversed by the user's hand. Also, the closed hand or fist position of the user's hand during the two hand gestures corresponds to the fast reverse/rewind command. In this exemplary scenario, the fast reverse/rewind command generated by the hand gesture control system 100, as a result of detecting the hand gesture 326, would fast reverse/rewind the presented video program. (Further, when the user 128 wishes to stop the fast reverse/rewind of the presented video program, the user 128 would generate a corresponding emulated remote control device command to perform the above-described stop function command of FIG. 3B.)

Figure 3J:
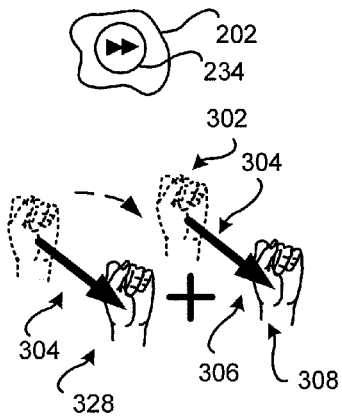

FIG. 3J illustrates an exemplary hand gesture 328 which corresponds to a fast forward command generated when the fast forward button 234 on the remote control device 200 is actuated. Here, two non-random hand gestures to the left along the predefined path 304 is traversed by the user's hand. Also, the closed hand or fist position of the user's hand during the two hand gestures corresponds to the fast forward command. In this exemplary scenario, the fast forward command generated by the hand gesture control system 100, as a result of detecting the hand gesture 328, would fast forward the presented video program. (Further, when the user 128 wishes to stop the fast forwarding of the presented video program, the user 128 would generate a corresponding emulated remote control device command to perform the above-described stop function command of FIG. 3B.)

Figure 3K:
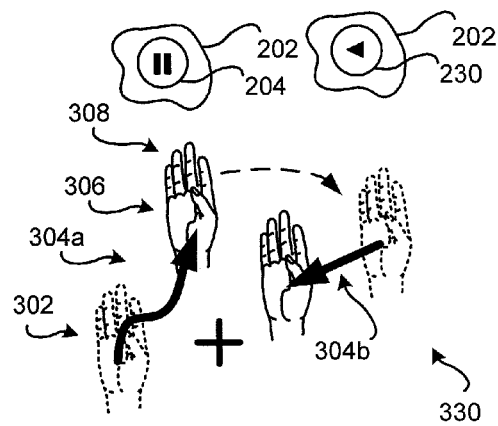

In some embodiments, multiple different hand gestures performed in sequence will result in generation of a hand gesture command corresponding to a plurality of sequentially activated actuators on the remote control device 200. FIG. 3K illustrates an exemplary hand gesture 330 which would generate a corresponding emulated remote control device command to perform a slow motion reverse play function. Here, a pause hand gesture command is followed by a reverse direction hand gesture command. A slow motion reverse play function command is generated when the pause button 202 and the reverse button 230 on the remote control device 200 are sequentially actuated. Here, the two non-random hand gestures along the predefined paths 304a, 304b are sequentially traversed by the user's hand. However, the traversed paths 304a and 304b are different. The traversed path 304a is an upwards and to the left movement of the user's hand. The traversed path 304b is a short jabbing motion to the right.

Figure 3L:
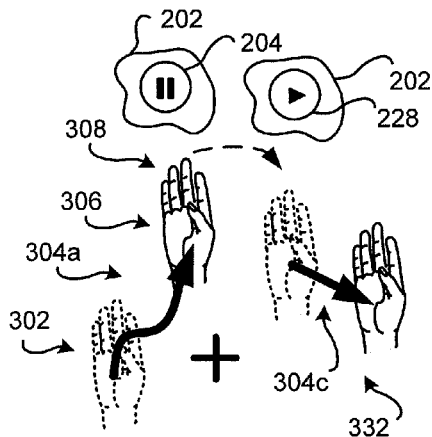

FIG. 3L illustrates an exemplary hand gesture 332 which would generate a corresponding emulated remote control device command to perform a slow motion forward play function. Here, a pause hand gesture command is followed by a forward play direction hand gesture command. A slow motion forward play function command is generated when the pause button 202 and the forward button 228 on the remote control device 200 are sequentially actuated. Here, the two non-random hand gestures along the predefined paths 304a, 304c are sequentially traversed by the user's hand. However, the traversed paths 304a and 304c are different. The traversed path 304a is an upwards and to the left movement of the user's hand. The traversed path 304c is a short jabbing motion to the left.

Figure 3M:
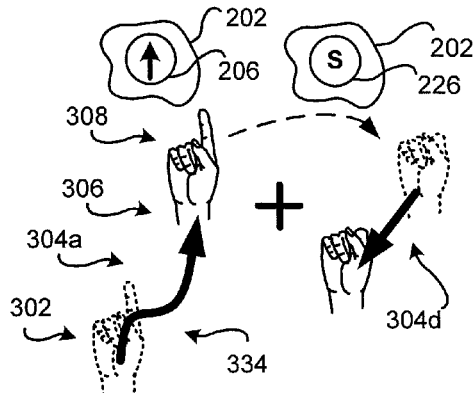

FIG. 3M illustrates an exemplary hand gesture 334 which would generate a corresponding emulated remote control device command to increase the channel upwards by one channel function. Here, a channel up hand gesture command is followed by a selection hand gesture command. A single channel up command is generated when the channel up button 210 and the select button 226 on the remote control device 200 are sequentially actuated. Here, the two non-random hand gestures along the predefined paths 304a, 304d are sequentially traversed by the user's hand. However, the traversed paths 304a and 304d are different. The traversed path 304a is an upwards and to the left movement of the user's hand. The traversed path 304c is a short jabbing motion to the right.

Further, the position of the user's hand at the initial location 302 during the first, channel up hand gesture has the user's index finger extending in an upwards direction (similar to the position of the user's hand at the ending location 306). During the second hand gesture, the closed hand or fist position of the user's hand is used (corresponding to the above described reverse command). Thus, in this example, the position of the user's hand while at the initial location 302 is relevant to determination of the intended command of the user 128.

Also, the position of the user's hand at the ending location 306 of the second hand gesture was in the closed hand or fist position. A similar closed hand or fist position at the ending location 306 was used to define the fast forward play hand gestures illustrated in FIG. 3I. Here, position of the user's hand (upward pointed index finger) of the first gesture, followed by the second hand gesture in the closed hand or fist position, defined the intended command to select a single channel up change.

It is appreciated that, with respect to FIG. 3M, one or more intermediate hand gestures corresponding to the first hand gesture (upward motion of the user's hand with the upward pointing index finger) may be used to indicate the number of upward channel changes. For example, if the user 128 made three hand gestures with an upwards pointed index finger as described, followed by the closed hand or fist hand gesture, that a device command would be generated by the hand gesture control system 100 that would change the channel upwards by three channels.

In view of the above-described hand gesture commands of FIGS. 3A-3M, it is appreciated that the position of the user's hands during a sequence of hand gestures, and/or the shape of the predefined traversed paths used during the sequential hand gestures, may be the same or they may be different. Further, the user's hand position at the initial location 302 of the traversed path 304 may be relevant to the nature of the determined hand gesture command. Many different predefined paths that are to be traversed by the user's hands 130a and/or 130b are possible. Further, many different initial and ending hand positions are possible. Accordingly, it is appreciated that a particular hand gesture, or sequence of hand gestures, may be defined so as to emulate the actuation, or series of actuations, of any actuator(s) of the emulated remote control device 200.

Figure 4:
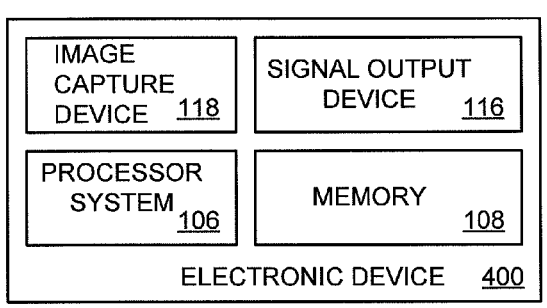
FIG. 4 is a block diagram of an electronic device with an embodiment of the hand gesture control system.
Figure 4:
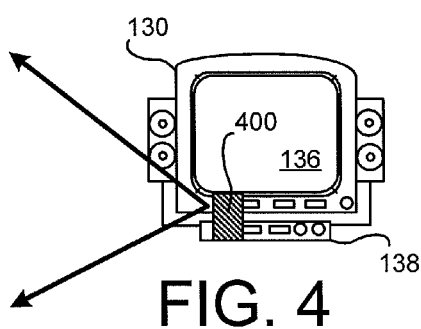

FIG. 4 is a block diagram of an electronic device 400 with an embodiment of the hand gesture control system 100. The non-limiting exemplary embodiment 400 comprises a processor system 106, a memory 108, a signal output device 116, and an image capture device 118. The memory 108 comprises portions for storing the hand gesture recognition logic 120, the hand gesture database 122, the remote control device (RCD) command database 124, and the command interpretation logic 126 as described above and illustrated in FIG. 1.

Here, the electronic device 400 is a relatively small electronic device. The electronic device 400 is placed in proximity to or coupled to a controlled device, illustrated here as the television 134 and/or the surround system 138. The signal output device 116 is configured to communicate with a receiver (not shown) in the controlled device that receives commands or signals from a remote control device (not shown). Thus, the electronic device 400 may be placed so that one or more hand gestures from a user 128 generate emulated remote control device commands that emulate device commands generated by the remote control device that is configured to operate that particular controlled device.

Some embodiments of the electronic device 400 may be configured to operate a variety of different controlled devices. Thus, logic is included in the memory 108 that allows identification of remote control device commands that operate the controlled device. Such commands may reside in the RCD command database 124 (FIG. 1). Alternatively, the electronic device 400 may be configured to control a specific controlled device. Thus, such an embodiment would have specific, and predefined, remote control device commands residing in the RCD command database 124.

An optional exemplary feature employed by some embodiments of the hand gesture control system 100 includes an activation command feature. A special hand gesture activation command must be first detected prior to the hand gesture control system 100 issuing a device command. Thus, ordinary movement of the user 128 will not inadvertently result in a generation of a device command. Until the activation hand gesture command is identified, the hand gesture control system 100 remains disabled so that device commands are not generated based upon detected hand gestures. Here, an activation engagement hand gesture is stored in the hand gesture database 122 of the memory 108. Hand gestures from the user 128 are continuously monitored. Once the hand gesture control system 100 determines that the user 128 has made the activation hand gesture corresponding to the activation hand gesture command, future detected hand gestures may result in the generation of device commands. Some embodiments may also include a deactivation hand gesture command feature such that, upon detecting the user 128 making the deactivation hand gesture, the hand gesture control system 100 then becomes configured to disregard further hand gestures.

Another optional exemplary feature employed by some embodiments of the hand gesture control system 100 includes an engagement command feature. A special hand gesture engagement command must be first detected prior to the hand gesture control system 100 issuing a device command. When the hand gesture control system 100 determines that the user 128 has the engagement hand gesture, that user 128 is monitored for a hand gesture command that is expected to be immediately forthcoming. Some embodiments may also include a disengagement hand gesture command feature such that, upon detecting the user 128 making the disengagement hand gesture, the hand gesture control system 100 then understands that the user 128 is done making their hand gesture commands. For example, such a feature would be used to cause display of an electronic program guide (EPG) and then end display of the EPG when the user 128 is done navigation through the displayed EPG.

In some embodiments, the hand gesture control system 100 will include an optional learning function that allows the hand gesture control system 100 to recognize a particular hand gesture. Here, the hand gesture control system 100 is first placed into a learning mode. For example, a special actuator, or a series of actuators, on the remote control device 200 and/or the media device 102 may be actuated to place the hand gesture control system 100 in the learning mode of operation. To start, the user 128 may enter one command, or a series of commands, by actuating the buttons or the like on their remote control device 200 and/or the media device 102.

Upon conclusion of the entry of the one or more commands, the image capture devices 118, 132 would monitor the user 128 and determine a unique user defined hand gesture command. Then, the unique user defined hand gesture command is associated with the one or more entered commands, and then is saved into the hand gesture database 122. Accordingly, a particular user 128 may preprogram a series of user commands to the hand gesture control system 100. The hand gesture control system 100 "remembers" the particular, unique learned hand gesture command corresponding to the series of commands.

Then, during operation, the hand gesture movement of the user 128 may be compared with the unique user defined hand gesture command associated with the series of remote control device commands. For example, a particular hand gesture may be defined to change the current channel presented on the TV 134 to a particular channel of interest. If the remote control device 200 is used to change channels, several different buttons or the like may need to be actuated on their remote control device 200. On the other hand, a single unique learned hand gesture command may be used to generate the series of commands.

In an exemplary embodiments, a calibration screen may be displayed so that the user 128 can confirm the remote control device command(s) that will be used to create a learned user defined hand gesture command. The calibration screen may display a textual listing, and/or an iconic listing, of the remote control device commands. Also, the calibration screen may show a video of the user's unique hand gesture, and/or generate a cartoon-like video of the user's hand gesture. Further testing and confirmation of the user defined hand gesture command may be controlled via the calibration screen, which may be configured as a graphical user interface type menu.

For example, a user defined hand gesture ending with two upwardly extended fingers on the user's right hand 130*a* and/or on the user's left hand 130*b* may be understood to correspond to a learned user defined hand gesture command to change the channel to a first predefined channel. Similarly, a hand gesture ending with three upwardly extended fingers may be understood to correspond to a learned user defined hand gesture command to generate a corresponding emulated remote control device command to change the channel to a second predefined channel.

Some embodiments may analyze hand gestures of the user 128 based upon captured image information provided by more than one image capture devices. Upon determination of a hand gesture movement captured by a first image capture device, image information from a second image capture device, or a plurality of other image capture devices, is used to verify the hand gesture command. That is, hand gesture commands that are determined from multiple images are compared, and then issued as device commands when the comparison verifies that the user 128 has made a particular hand gesture command.

It should be emphasized that the above-described embodiments of the hand gesture control system 100 are merely possible examples of implementations of the invention. Many variations and modifications may be made to the above-described embodiments. All such modifications and variations are intended to be included herein within the scope of this disclosure and protected by the following claims.

What is claimed is:

1. A media device, comprising:
   a program content stream interface configured to receive a program content stream comprising media content;
   an image capture device configured to capture a series of images of a user, and configured to generate image information corresponding to the series of captured images;
   a memory storing a plurality of predefined hand gesture commands, each of the predefined hand gesture commands uniquely corresponding to at least one of a plurality of commands associated with a remote control device, wherein the remote control device is configured to control at least one of the media device and an external device;
   a processor system communicatively coupled to the image capture device and the memory, wherein the processor system is configured to:
   receive the image information from the image capture device,
   identify at least one hand gesture made by the user from the received image information,
   determine a hand gesture command based upon the identified hand gesture,
   compare the determined hand gesture command with the plurality of predefined hand gesture commands,
   identify a matching hand gesture command from the plurality of predefined hand gesture commands corresponding to the determined at least one hand gesture command,
   determine whether the hand gesture command corresponds with operation of one of the media device and the external device,
   if the hand gesture command corresponds with operation of the media device, modifying output of the media content received by the program content stream interface based on the hand gesture command, and
   if the hand gesture command corresponds with the operation of the external device, generating an emulated remote control device command based upon the identified matching hand gesture command that is configured to control the operation of the media device; and a signal output device communicatively coupled to the processor system and configured to wirelessly communicate the emulated remote control device command from the media device to the external device, wherein the communicated emulated remote control device command is the same as a corresponding wireless command that would be communicated from the remote control device.

2. The media device of claim 1, wherein the signal output device comprises an infrared (IR) emitter configured to emit the emulated remote control device command as an IR command that is receivable by the external device.

3. The media device of claim 1, wherein the signal output device comprises a radio frequency (RF) emitter configured to emit the emulated remote control device command as a RF command that is receivable by the external device.

4. The media device of claim 1, wherein the signal output device configured to communicate the emulated remote control device command to at least one media presentation device using a communication media that is used by the remote control device.

5. The media device of claim 1, wherein the image capture device is an external image capture device that is communicatively coupled to the processor system.

6. The media device of claim 1, wherein the image capture device is included in the media device.

7. The media device of claim 1, wherein the determined hand gesture command causes the signal output device to output the emulated remote control device command as a serial output of a plurality of control signals, wherein each of the plurality of output control signals are the same as a corresponding plurality of remote control device commands that are configured to control a same operation of the media device.

8. The media device of claim 1, wherein the at least one hand gesture is a first hand gesture, and wherein the series of capture images includes at least the first hand gesture and a second hand gesture, wherein the processor system is configured to:
   identify the second hand gesture made by the user from the received image information, and
   determine a hand gesture command based upon the identified first hand gesture and the identified second hand gesture.

9. An apparatus, comprising:
an image capture device configured to capture a series of images of a user, and configured to generate image information corresponding to the series of captured images;
a memory storing a plurality of predefined hand gesture commands, each of the predefined hand gesture commands uniquely corresponding to at least one of a plurality of commands associated with a media device;
a processor system communicatively coupled to the image capture device and the memory, wherein the processor system is configured to:
   receive the image information from the image capture device,
   identify at least one hand gesture made by the user from the received image information,
   determine a hand gesture command based upon the identified at least one hand gesture,
   compare the determined hand gesture command with the plurality of predefined hand gesture commands,
   identify a matching hand gesture command from the plurality of predefined hand gesture commands corresponding to the determined hand gesture command,
   generate an emulated remote control device command based upon the identified matching hand gesture command that is configured to control operation of the media device; and
a signal output device configured to communicate the emulated remote control device command wirelessly to an external device.

10. The apparatus of claim 9, wherein the signal output device comprises an infrared (IR) emitter configured to generate an IR command for the external device.

11. The apparatus of claim 9, wherein the signal output device comprises a radio frequency (RF) emitter configured to emit the emulated remote control device command as a RF command that is receivable by the external device.

12. The apparatus of claim 9, wherein the determined hand gesture command causes the signal output device to output the emulated remote control device command as a serial output of a plurality of signals, wherein each of the plurality of output signals are the same as a corresponding plurality of remote control device commands that are configured to control a same operation of the external device.

13. The apparatus of claim 9, wherein the external device is another media device configured to receive at least one of a broadcasted program content stream with media content therein, wherein the emulated remote control device command is configured to control the media device.

14. The apparatus of claim 9,
   wherein the external device is another media device configured to receive at least one of a broadcasted program content stream with media content therein,
   wherein the emulated remote control device command is configured to control a presentation device communicatively coupled to the media device, and
   wherein in response to receiving the emulated remote control device command at the media device, the media device generates and communicates commands to the presentation device to control presentation of media content by the presentation device in accordance with the emulated remote control device command.

15. A method to generate commands based upon hand gestures made by a user, wherein the commands emulate device commands generated by a remote control device, the method comprising:
   generating image information from a series of captured images;
   identifying a hand gesture made by the user from the generated image information;
   comparing the identified hand gesture with a plurality of predefined hand gesture commands to identify a hand gesture command that matches one of the plurality of predefined hand gesture commands;
   generating an emulated remote control device command based upon the identified matching hand gesture command; and
   communicating the emulated remote control device command wirelessly to a media device, wherein the media device is controlled based upon the wirelessly communicated emulated remote control device command.

16. The method of claim 15, wherein identifying the hand gesture made by the user from the image information comprises:
   identifying a serial plurality of hand gestures made by the user;
   determining a first hand gesture command from a first portion of the series of captured images of the user;
   determining a second hand gesture command from a second portion of the series of captured images of the user, wherein the second portion of the series of captured images is different from the first portion of the series of captured images;
comparing the determined first hand gesture command with the plurality of predefined hand gesture commands to identify a first matching hand gesture command from the plurality of predefined hand gesture commands;
comparing the determined second hand gesture command with the plurality of predefined hand gesture commands to identify a second matching hand gesture command from the plurality of predefined hand gesture commands; and
generating the emulated remote control device command based upon the identified first matching hand gesture command and the second matching hand gesture command.

17. The method of claim 16, wherein the emulated remote control device command controls a display based on an electronic program guide (EPG) displayed on the display, and further comprising:
determining a subsequent hand gesture command from a subsequent second series of captured images of the user;
comparing the determined subsequent hand gesture command with the plurality of predefined hand gesture commands to identify a subsequent matching hand gesture command from the plurality of predefined hand gesture commands, wherein the subsequent matching hand gesture command corresponds to a remote control device command that causes movement of an active pane of the EPG;
generating a subsequent emulated remote control device command based upon the identified subsequent matching hand gesture command; and
controlling the display based upon the subsequent emulated remote control device command such that the active pane of the EPG is moved from a first position to a second position.

18. The method of claim 16, further comprising:
determining an enablement hand gesture command from a first one of the serial plurality of hand gestures made by the user,
wherein a subsequent hand gesture command determined from at least a second one of the plurality of hand gestures is used to generate the emulated remote control device command, and
wherein the emulated remote control device command is determined only after the enablement hand gesture command is determined.

19. The method of claim 16, further comprising:
determining a disablement hand gesture command from a last one of the serial plurality of hand gestures made by the user, wherein further determined user hand gestures are disregarded,
wherein the emulated remote control device command is based upon other ones of the serial plurality of hand gestures made by the user.

20. The method of claim 15, wherein communicating the emulated remote control device command comprises communicating the emulated remote control device command as one of a radio frequency (RF) signal and an infrared (IR) signal receivable by the media device.

* * * * *